ized Patent [19] | [11] 4,113,505
Bellanca et al. | [45] Sep. 12, 1978

[54] ZONED COLORATION

[75] Inventors: Nicolo Bellanca; Thomas Edward Furia, both of San Jose, Calif.

[73] Assignee: Dynapol, Palo Alto, Calif.

[21] Appl. No.: 799,795

[22] Filed: May 23, 1977

Related U.S. Application Data

[60] Continuation of Ser. No. 612,508, Sep. 11, 1975, abandoned, which is a division of Ser. No. 460,908, Apr. 15, 1974, Pat. No. 3,937,851.

[51] Int. Cl.² .......................... C08L 5/00; C09H 9/00
[52] U.S. Cl. ................................. 106/137; 106/209; 8/DIG. 7
[58] Field of Search ................. 106/137, 209; 260/144

[56] References Cited

U.S. PATENT DOCUMENTS 3,046,605  7/1962  Grief et al. ........................... 106/137
3,920,855  11/1975  Dawson ............................. 8/DIG. 7

Primary Examiner—Theodore Morris
Attorney, Agent, or Firm—William H. Benz

[57] ABSTRACT

Viscoelastic materials are differently colored in zones with polymric dyes. When a polymeric dye is added to a zone of a viscoelastic material it does not migrate from the zone; thus permitting an essentially permanently multizoned colored product.

4 Claims, No Drawings

ZONED COLORATION

REFERENCE TO RELATED APPLICATIONS

This is a continuation of copending application Ser. No. 612,508, filed Sept. 11, 1975, and now abandoned which in turn was a division of and copended with application Ser. No. 460,908, filed Apr. 15, 1974, now U.S. Pat. No. 3,937,851, issued Feb. 10, 1976.

BACKGROUND OF THE INVENTION

This invention relates to varicolored, multizoned, viscoelastic materials having a common phase. Preferably, it relates to semi-solid viscoelastic foodstuffs having zoned coloration.

Viscoelastic materials such as flexible soft plastics and gels present a peculiar coloring property. Due to their semi-solid, semi-fluid nature, these materials permit conventional dyes to migrate throughout their entire body. While this migration (which appears as color "spreading" or "leaking") is of no consequence in uniformly colored items, it does pose a problem when a varicolored product is desired. Varicolored products of this type include flexible children's plastic toys, multicolored cosmetic items, rubber objects containing dye-printed labels, and gelled foodstuffs, such as gelatin desserts and pies. Solutions to this problem have offered disadvantages of their own. Particulate colored lakes, while not appreciably migrating in the products, tend to cloud and haze finished products and to present settling problems during processing. Paints and other surface treatments can rub off and present a much different appearance than really desired.

STATEMENT OF THE INVENTION

It has now been found that the problem of dye migration in viscoelastic materials is solved when the dye employed is polymeric. Thus, a composition or article having a plurality of zones which differ from one another in color but which have a common phase, is made up of viscoelastic material with a set concentration of polymeric dye in at least one, but not all, of these zones. In a preferred application, the viscoelastic material is a foodstuff, especially a gel, such as gelatin so that foodstuffs with distinct permanent color variations are provided.

DETAILED DESCRIPTION OF THE INVENTION

The colored compositions of this invention are made up of a multizoned substrate of viscoelastic material having, in some zones, a polymeric dye.

The Substrates

The substrates employed in these compositions are characterized as semi-solids and as being viscoelastic materials. They are plastic masses and may be in the form of gels, rigid plastic articles, or plastic films. Included within the class of substrates colored by the present invention are viscoelastic polymers such as synthetic rubbers, highly plasticized polymers such as polyvinylchloride containing from 5% to 60% of a plasticizer, e.g., dioctyl phthalate, or 6 to 10 carbon alcohols. In a preferred embodiment, the substrate is a viscoelastic edible composition. Among the most common of these compositions are aqueous protein gels — exemplified by gelatin, and aqueous polysaccharide gels — exemplified by pectin gels. Other protein gels include partially hydrolyzed collagen glues, casein, and egg albumin gels. Polysaccharide gels additionally include gels of pectic and pectinic acids; gels of seaweed polysaccharides such as algin, alginic acid derivatives — for example, propylene alginate, the carrageenans, furcellaran, and agar. These compounds are merely representative, and other substrates having viscoelastic properties may be used as well. Preferred substrates are aqueous-based and contain substantial amounts (at least 50% by weight) of water in a common phase among zones. Most preferred substrates contain from 60% to 98% by weight of water.

These viscoelastic substrates are formed by conventional methods known to the art, which in and of themselves are not a part of this invention.

The Dyes

Polymeric dyes must be employed in this invention. A polymeric dye contains two parts: a chromophore part, indicatable by Ch, which supplies the color; and a nonchromophore part, indicated by B, which joins the chromophores into a polymer. These dyes may assume the structure

or the structure

wherein $n$ is an integer greater than 1, such as from 2 to 4,000, especially 10 to 3,000. Although the average molecular weights which correspond to these values of $n$ of course depend upon the size of B and Ch, it is generally preferred to employ polymeric dyes of molecular weight 1,000 to 1,000,000, so long as they do contain a plurality of chromophores. A preferred molecular weight range is from 2,000 to 400,000.

While it is not wished to limit this invention to any particular chromophore, Ch, or nonchromophore, B, there are restraints on these components. In the overall molecule, for each part by weight of Ch there can be from 0.1 to 2 parts of B. If the amount of B is lowered below 0.1 parts, there are problems with color predictability and reproducability. If the amount of B is raised above about 2 parts, the diluent effect of B on the colorant's intensity becomes great, and suitably colored products, except for pastels, are not obtained. Especially good results are obtained when for each part by weight of Ch there is from 0.2 to 1.5 parts of B.

The chromophores employed, Ch, are organic materials. Inorganic colors, such as the ferricyanides and the like, are not suitable. Due to their polymeric nature, the final products can be made so large that they cannot be absorbed out of the gastrointestinal tract into the blood stream, and thus be totally nontoxic. This desirable property is achieved when molecular weights are 2,000 or 5,000 or larger. Thus it is possible in the preferred food applications to incorporate chromophores which previously were not usable in foods because of toxicity.

Exemplary chromophores include known azo dyes such as

CI Acid Yellow #36

-continued
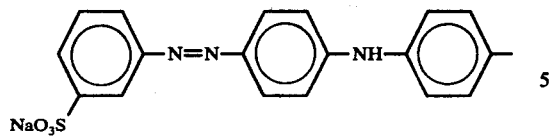
CI Mordant Orange #1
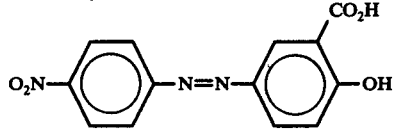
FD&C Yellow #6
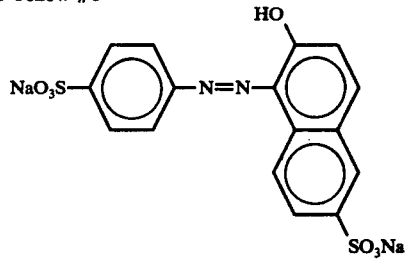
FD&C Yellow #5
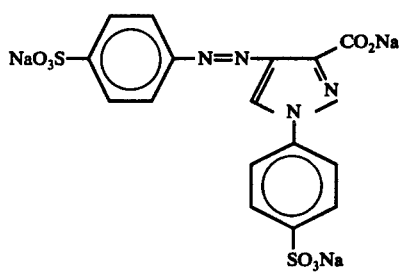
FD&C Red #2
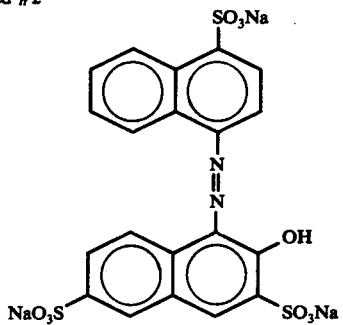
and FD&C Red #40
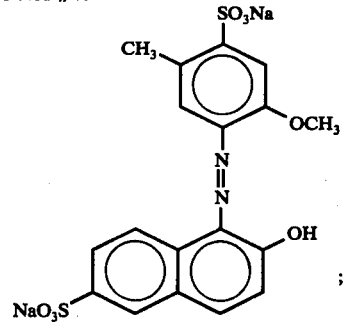
indigoid dyes such as
CI Vat Blue #1
-continued
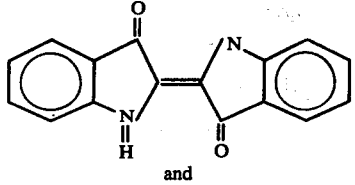
and
FD&C Blue #2
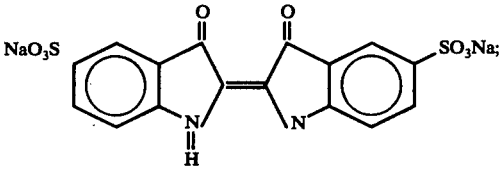
and triphenylmethane dyes such as
FD&C Green #3
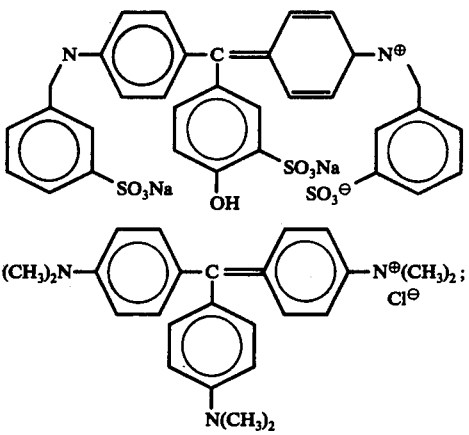
FD&C Violet #1
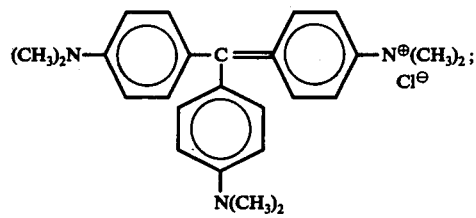, and
CI Basic Green #4
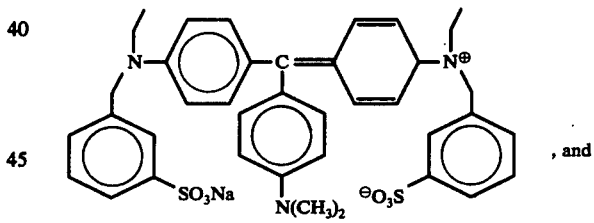
and heterocyclic dyes such as
CI Basic Blue #9
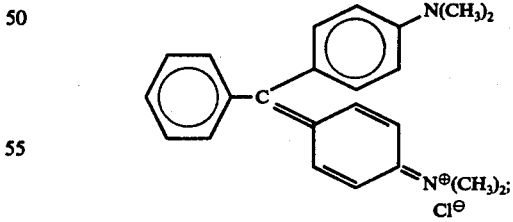
and Uranine
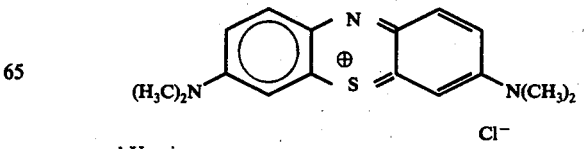

-continued

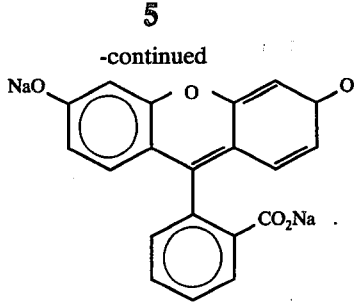

This list is intended merely to be illustrative and is not to be construed as limiting the specific chromophores or even classes of chromophores which can be employed.

The Linking Groups, B

The chromophores are linked into polymers via linking groups, B. The B groups are organic. They provide a plurality of active groups which attach to a plurality of chromophores; or, if the chromophores are so-called "reactive chromophores", having their own reactive groups, they can merely provide active cites to which the chromophores can attach.

Examples of the first type of B include simple links providing two active groups, such as the two olefinic groups in divinylbenzene or 1,4-butadiene; the two hydroxyl groups ethylene glycol, or hydroquinone, or more complex links providing a large number of active groups, such as poly(1,2-butadiene), polyacrylic acid, polyethyleneimine (both linear and branched), poly-2 or 4-vinylpiperidine, polybuteneamine, polyvinylalcohol, polyvinyl-(3-aminopropyl)-ether, cyclopolydiallylamine, poly-2-aminoethylmethacrylate, polyvinyl(2-aminoethyl)-ether, polyacrolein, poly-2-amino-1-vinylethanol, and polyepichlorohydrin.

Examples of the second type of B include cellulose, polyethers, hydrocarbons, and the like.

The linking groups may also include nonchromophoric groups which modify the polymer's properties; for example, its solubility in water or oil.

These polymeric dyes can be made by methods known in the art. As this invention involves an application of these dyes rather than the dyes per se, a detailed description of the production will not be provided. The Examples contain several representative preparation, however.

The Colored Products

The products of this invention have a plurality of zones, at least one of which contains a coloring amount of a polymeric dye. A "coloring amount" of a polymeric dye is defined to be an amount which will impart a noticeable or desirable degree of coloration to a zone. While the exact amount of dye employed as a "coloring amount" varies widely depending upon the color desired, the dye used, and the nature of the substrate, as a rule, from about 1 ppm weight to about 2% by weight of dye, especially from 25 to 2,000 ppm by weight of dye, basis substrate, may satisfy the requirement for a "coloring amount".

All the zones should not be identically colored, since if the product is uniformly colored there is little reason to use the present invention, as color migration and spreading would not be a problem. The variation from one zone to another may be achieved by using different concentrations of a single polymeric dye in the various zones, by only coloring a portion of the zones, or by using different polymeric dyes in the different zones. As will be recognized, combinations of colors may be used.

The colored products are formed by dissolving the polymeric dye in the substrate material, usually when the substrate material is in a fluid-liquid state, and thereafter permitting the substrate to take on its semi-solid state. The multizoned nature of the colored products may be achieved by casting a plurality of separate zones from various polymeric dye-colored substrates. In another variation, the colored substrates may be lightly mixed or polymeric dyes may be gently swirled through the substrate to give a varicolored effect.

The invention will be further illustrated by the following Examples. There are to demonstrate the invention and are not to be construed as limiting its scope.

EXAMPLE I

A. A 15 g portion of polyacrylic acid is dissolved in 75 ml of concentrated sulfuric acid with stirring at room temperature for 40 minutes. The polyacrylic acid solution is then stirred at 40° C. while 140 ml of 2.15 M hydrazoic acid ($HN_3$) in benzene is added dropwise with stirring over a period of 4.5 hours. The reaction, a Schmidt rearrangement, is continued at 40° C. for about 14 hours. The mixture is then stripped of benzene to give an almost clear yellow solution, which is cooled to 5° C. Methanol (150 ml) is then added. The resulting emulsion is centrifuged at high speed for 30 minutes to separate the precipitate. The precipitate is dissolved in 50 ml of water and gives a yellow solution. This solution is precipitated by addition to methanol, the precipitate being once again dissolved and precipitated a third time for purification. 12.06 Grams of a white solid are recovered. Elemental analysis shows this product to be a copolymer of acrylic acid (mole ratio 0.46) and vinylamine (mole ratio 0.54).

B. 10 Grams of the product of Part A are dissolved in 35 ml of water. An 11% solution of sodium hydroxide is then dripped in to a pH of 9. 28.5 Grams of N-acetylsulfanilyl chloride is added in small portions over a period of 5.5 hours. The pH of the solution is increased throughout the addition in order to keep the polymer in solution, gradually increasing from an initial pH of about 9 to a final pH of about 12.5. After completing the addition of N-acetylsulfanilyl chloride, conditions are maintained constant for 1 hour and then the cloudy yellow solution which results is filtered. The resulting clear yellow solution is dripped into a stirred 25% solution of acetic acid to give a white precipitate, which is collected, rinsed with water, and dried in vacuo to give 20.8 g of a white powder.

18.7 Grams of the white powder is suspended in 75 ml of 10% aqueous hydrochloric acid, and this mixture is heated at reflux with stirring under argon for 1 hour (to hydrolyze the N-acetyl group). A clear yellow solution results. This solution is cooled to about 50° C. and dripped warm into an aqueous solution of sodium acetate in an ice bath. The resulting slurry is filtered and washed with dilute aqueous acetic acid (pH3). After drying in vacuo, 11.5 g of a fine white powder is recovered, which upon NMR analysis is shown to be the following polymeric sulfanilamide

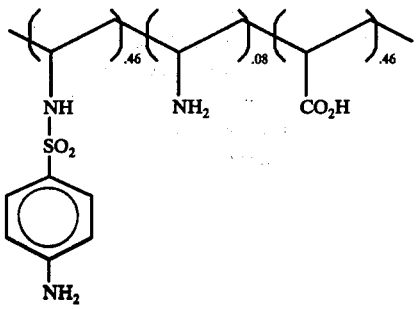

C. 2.975 Grams of the polysulfanilamide product of Part B is dissolved in 45 ml of 10% hydrochloric acid and 200 ml of water with stirring. 1.0 N aqueous sodium nitrite solution (11.0 ml) is added to give a dark yellow solution, which is then dripped gradually into a solution of 2.46 g of Schaeffer's salt in 67 ml of 10% aqueous sodium hydroxide and 90 ml of water, while stirring in an ice bath. The resulting deep red solution is stirred in the ice bath for 30 minutes, treated with 10% aqueous hydrochloric acid to a pH of 2 to yield an orange suspension which is centrifuged. The separated solids are purified by dialysis to yield 4.4 g of an intense orange colorant having a color similar to that of Sunset Yellow (FD&C Yellow #6). Analysis showed that this dye has the following structure

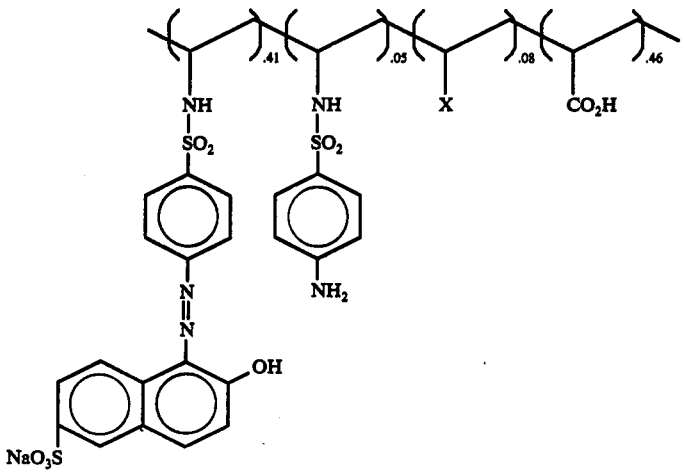

D. A dye concentrate and several typical substrates are prepared. One gram of the dye of part C is dissolved in 1,000 ml of water.

A gelatin substrate is prepared by dissolving 7 g of dry gelatin on 250 ml of hot water.

A pectin substrate is prepared by dissolving and boiling 5 g of pectin (jelly grade) in 250 ml of water.

An agar substrate is prepared by dissolving 5 g of agar in 250 ml of water.

Each of the three substrates, while in liquid form, is divided into two equal portions. One portion of each substance is added to about 125 ml of the dye concentrate, which is enough to impart an orange color darker than required in orange jellies, gelatin desserts, candies, and the like. These colored substrates are poured into 1,000 ml beakers and cooled until they become semi-solid. The remaining (uncolored) substrates are then added to the beakers on top of the corresponding colored substrates and cooled until semi-solid. The beakers are inspected. The color layers are separate with no evidence of color migration or spreading into the uncolored zone. The samples are stored in a refrigerator for 28 days. After that time they are inspected again. No evidence of color migration is noted.

E. The experiments of part D are repeated using the monomeric FD&C Yellow #6 (Sunset Yellow) instead of the polymeric dye. Shortly after the uncolored portions of substrate are added on top of the colored portions, some color migration into the uncolored portion is noted. After the 28-day standing period, substantial migration of color is noted — no clear definition between zones is possible.

EXAMPLE II

The preparation of polysulfanilamide in accord with parts A and B of Example I is repeated, the product differing from the product of Example I only in insignificant variations in molar ratios.

1.0 Grams of the above product is dissolved in 10 ml of 10% aqueous hydrochloric acid and 40 ml of water to yield a clear yellow solution. This solution is stirred at room temperature while 2.48 ml of a 1.0 N aqueous sodium nitrite solution is added. This solution is then added over a period of 5 minutes to a solution of 738 ml of Pyrazolone T,

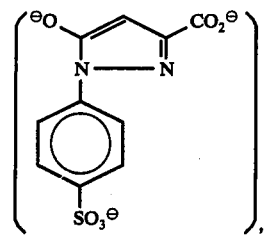

in 15 ml of 10% aqueous sodium hydroxide and 20 ml of water while stirring in an ice bath. A deep red solution results. This solution is acidified with 10% hydrochloric acid. At pH 2 a yellow-orange precipitate forms, which is separated and purified by dialysis. This product is dried and upon analysis found to be the following polymeric coloring:

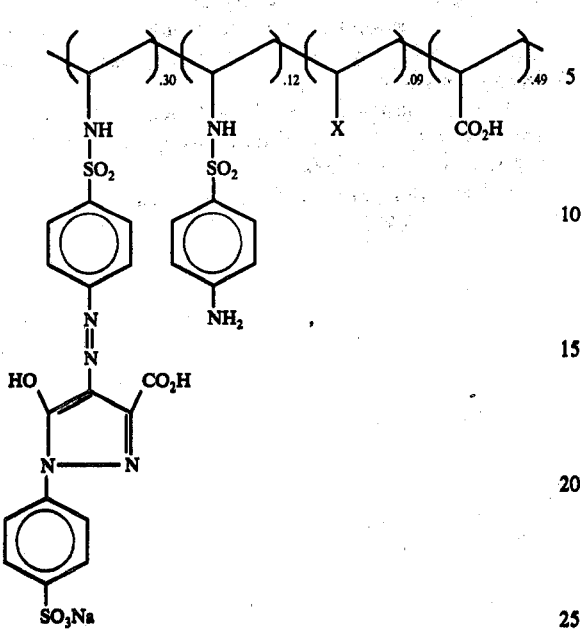

(wherein X is $NH_2$ or OH).

This colorant is similar in color to Tartrazine (FD&C Yellow #5),

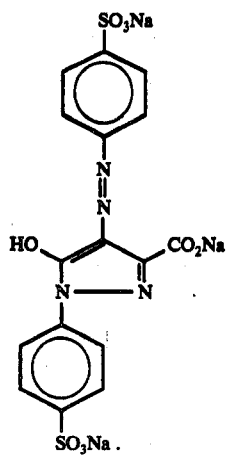

When this colorant is added to certain zones of viscoelastic substrates, such as semi-solid plastics, it does not appreciably migrate from the certain zones into other zones.

EXAMPLE III

A. Polyscience Corporation's commercial branched polyethyleneimine of molecular weight 1,200 is treated in accordance with the general procedures of parts A and B of Example I with —N-acetylsulfanilyl chloride in aqueous base and hydrolyzed to yield a polymeric sulfanilamide

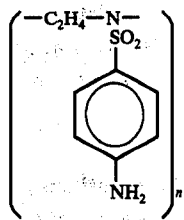

B. 209 Milligrams of the sulfanilamide of Part A is dissolved in 1.5 ml of 10% HCl and 5 ml of $H_2O$ and diazotized with 0.16 ml of 5.8 M aqueous sodium nitrite, and then added to 13.8 ml of a solution of 1.0 g of 8-amino-1-naphthol-3,6-disulfonic acid,

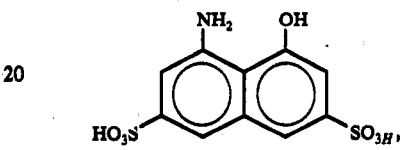

in 10 ml of 10% sodium hydroxide and 40 ml of $H_2O$. The resulting solution is deep purple. It is neutralized with hydrochloric acid and purified. The product has the chemical formula

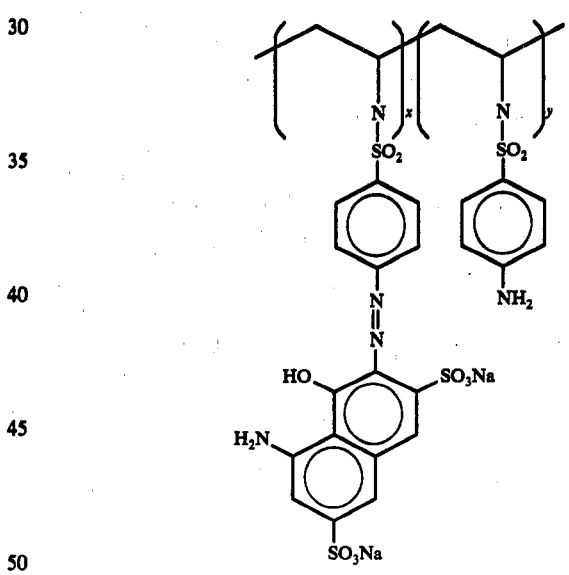

C. A three-colored gelatin dessert is prepared using the polymeric dye of this Example as well as the dyes of Examples I and II.

A solution of 5 g of gelatin, 50 mg of the colorant of this Example, 10 g of sugar, and grape flavor is prepared in 250 ml of hot water. 50–60 Milliliters of this solution is added to each of four large parfait glasses and permitted to cool and gel.

A solution of 5 g of gelatin, 50 mg of the colorant of Example I, 10 g of sugar, and orange flavor is prepared in 250 ml of hot water. The solution is cooled to about room temperature and poured into the parfait glasses on top of the burgundy-colored layer and chilled to set.

Finally, a solution of 5 g of gelatin, 50 mg of the colorant of Example II, 10 g of sugar, and lemon flavor is prepared in 250 ml of hot water. The resulting yellow solution is cooled to about room temperature and poured into the parfait glasses on top of the orange-colored layer and chilled. The resulting gelatin dessert has three distinct and separate layers. No color migration is noted initially or after several weeks of refrigerated storage.

We claim:

1. A permanently multicolored composition comprising a plurality of zones of viscoelastic material, said zones having dissolved therein different coloring amounts of polymeric dyes, and thereby permanently differing in color from one another.

2. The composition of claim 1, wherein a coloring amount of at least two different polymeric dyes are present in separate zones.

3. The composition of claim 1, wherein said polymeric colorant has a molecular weight of from about 1,000 to about 1,000,000.

4. The composition of claim 3, wherein said viscoelastic material is a gel.